(12) United States Patent
Brenner et al.

(10) Patent No.: US 8,008,561 B2
(45) Date of Patent: Aug. 30, 2011

(54) AUDIO FILE FORMAT WITH MAPPED LIGHTING EFFECTS AND METHOD FOR CONTROLLING LIGHTING EFFECTS USING AN AUDIO FILE FORMAT

(75) Inventors: David Brenner, Mundelein, IL (US); David Cranfill, Sparta, NJ (US); Michael Caine, Needham, MA (US)

(73) Assignee: Motorola Mobility, Inc., Libertyville, IL (US)

( * ) Notice: Subject to any disclaimer, the term of this patent is extended or adjusted under 35 U.S.C. 154(b) by 1382 days.

(21) Appl. No.: 10/346,409

(22) Filed: Jan. 17, 2003

(65) Prior Publication Data

US 2004/0139842 A1    Jul. 22, 2004

(51) Int. Cl.
G09B 15/00 (2006.01)
G09B 15/02 (2006.01)
G10H 1/00 (2006.01)

(52) U.S. Cl. ................. 84/477 R; 84/464 R; 84/645
(58) Field of Classification Search ........... 84/477 R, 84/464 R, 645
See application file for complete search history.

(56) References Cited

U.S. PATENT DOCUMENTS

| | | | |
|---|---|---|---|
| 4,995,026 A * | 2/1991 | Makabe et al. ............. | 369/70 |
| 5,262,582 A | 11/1993 | Hanzawa et al. | |
| 5,687,215 A | 11/1997 | Timm et al. | |
| 5,696,500 A | 12/1997 | Diem | |
| 5,763,804 A | 6/1998 | Rigopulos et al. | |
| 5,804,755 A | 9/1998 | Furukawa | |
| 5,986,201 A * | 11/1999 | Starr et al. ............... | 84/645 |
| 6,124,543 A | 9/2000 | Aoki | |
| 6,332,175 B1 | 12/2001 | Birrell et al. | |
| 6,360,101 B1 | 3/2002 | Irvin | |
| 6,395,969 B1 * | 5/2002 | Fuhrer .................. | 84/477 R |
| 6,417,439 B2 * | 7/2002 | Uehara et al. ............. | 84/645 |
| 6,449,080 B1 | 9/2002 | McBrien et al. | |
| 6,505,160 B1 | 1/2003 | Levy et al. | |
| 6,564,108 B1 * | 5/2003 | Makar et al. ............... | 700/17 |
| 6,689,947 B2 * | 2/2004 | Ludwig ................. | 84/721 |
| 6,721,489 B1 | 4/2004 | Benyamin et al. | |
| 6,828,498 B2 | 12/2004 | Sugiyama et al. | |

(Continued)

FOREIGN PATENT DOCUMENTS

CN    1131758 A    9/1996

(Continued)

OTHER PUBLICATIONS

"Scalable Polyphony MIDI Device 5-24 Note Profile for 3GPP", May 24, 2002, pp. 1-18, The MIDI Manufactures Associations, Los Angeles, CA, USA.

(Continued)

*Primary Examiner* — Jeffrey Donels

(57) ABSTRACT

An audio file format is provided, which includes definitions for one or more instruments that are associated with one or more light groupings, where each light grouping includes one or more light sources. Received commands present in the audio file, and associated with an instrument definition, are compared to determine if the associated instrument definition corresponds to one of the one or more light groupings. If the associated instrument definition corresponds to a light grouping, then the commands are mapped to corresponding display effects, and the illumination of the one or more light sources of the respective light grouping is controlled. If the associated instrument definition of the received command corresponds to an audio instrument, then an audible output is controlled in accordance with the received command.

2 Claims, 3 Drawing Sheets

U.S. PATENT DOCUMENTS

| | | | |
|---|---|---|---|
| 7,013,279 | B1 | 3/2006 | Nelson |
| 7,105,737 | B2 | 9/2006 | Frangopol et al. |
| 7,211,721 | B2 | 5/2007 | Boillot et |
| 2001/0008572 | A1 | 7/2001 | Ohmori et al. |
| 2001/0021649 | A1 | 9/2001 | Kinnunen et al. |
| 2002/0038157 | A1 | 3/2002 | Dowling et al. |
| 2002/0061772 | A1* | 5/2002 | Hayashi .......................... 455/567 |
| 2002/0078221 | A1* | 6/2002 | Blackwell et al. ............. 709/231 |
| 2002/0118949 | A1 | 8/2002 | Jones et al. |
| 2002/0170415 | A1 | 11/2002 | Hruska et al. |
| 2003/0003935 | A1 | 1/2003 | Vesikivi et al. |
| 2003/0024975 | A1 | 2/2003 | Rajasekharan |
| 2003/0030839 | A1 | 2/2003 | Walters et al. |
| 2003/0050058 | A1 | 3/2003 | Walsh et al. |
| 2003/0067440 | A1 | 4/2003 | Rank |
| 2003/0158614 | A1 | 8/2003 | Friel et al. |
| 2003/0166405 | A1 | 9/2003 | Jauk et al. |
| 2004/0092226 | A1 | 5/2004 | Tsutsui et al. |
| 2005/0107120 | A1 | 5/2005 | Yueh |

FOREIGN PATENT DOCUMENTS

| | | | |
|---|---|---|---|
| DE | 19652142 | A1 | 6/1998 |
| DE | 1990387 | A1 | 8/2000 |
| EP | 1111883 | A1 | 6/2001 |
| EP | 1161075 | A2 | 12/2001 |
| EP | 1330101 | A1 | 7/2003 |
| JP | 2001053832 | | 2/2001 |
| JP | 2001069567 | | 3/2001 |
| JP | 2000330557 | | 3/2011 |
| WO | 9708837 | A2 | 3/1997 |
| WO | 0207412 | A1 | 1/2002 |
| WO | 0225902 | A1 | 3/2002 |
| WO | 02077585 | A1 | 10/2002 |

OTHER PUBLICATIONS

Patent Office of the People's Repbulic of China, Application No. 200380108933.2, counterpart Motorola; Dec. 1, 2006, 8 pages.

Supplementary European Search Report for European Patent Application No. EP 03790047, Jul. 18, 2006, 5 pages, European Patent Office.

Australian Government, "Normal Examination", Aug. 13, 2007, pp. 3 pages, Australian Pat. Appln No. 2002301345, Australia.

European Patent Office, "Communication", Nov. 2, 2006, pp. 1-6, European Patent Application No. 03790047, European Patent Office.

United States Patent and Trademark Office, "Non-Final Office Action Summary", Oct. 5, 2009, pp. 1-27, U.S. Appl. No. 11/609,547, Alexandria, Virginia, USA.

United States Patent and Trademark Office, "Non-Final Office Action Summary", Sep. 12, 2005, pp. 1-7, U.S. Appl. No. 10/313,794, Alexandria, Virginia, USA.

Jean Laroche, "Synthesis of Sinusoids via Non-Overlapping Inverse Fourier Transform", IEEE Transactions on Speech and Audio Processing, Jul. 2000, pp. 471-477, vol. 8, No. 4.

* cited by examiner

AUDIO FILE FORMAT WITH MAPPED LIGHTING EFFECTS AND METHOD FOR CONTROLLING LIGHTING EFFECTS USING AN AUDIO FILE FORMAT

FIELD OF THE INVENTION

The present invention relates generally to the implementation and control of lighting effects and, more particularly, to the implementation and control of lighting effects, that are synchronized with the playback of audio from an audio file, in an electronic device.

BACKGROUND OF THE INVENTION

Portable electronic devices, such as cellular telephones and personal digital assistants (PDA's) provide information to users through an increasing number of modalities, including graphical information displayed on display screens, sound played through speakers, and vibrations generated via vibratory components. In addition to display screens, visual information may be presented through lighting elements integrated into or underneath the surface of a device's housing. These lighting elements may include light emitting diodes (LED's), electro-luminescent (EL) panels, polymer dispersed liquid crystal (PDLC) light valves, or various other components. The lighting elements, in at least some instances, can be used to provide visual ring tone alerts, visual indications of amplitude and frequency of ambient noise, and/or visual indications of battery or signal strength.

With the ever increasing number of modalities, and the increasingly sophisticated forms of the modalities, the need to provide suitable controls to accommodate the updated or enhanced types of modes becomes more pronounced. In some instances new controls need to be implemented. In other instances, existing controls can be extended to accommodate the further functionality. However, regardless of the manner in which the controls are implemented, it may be desirable to be able to coordinate the presentation of the various modalities to the user. For example, it may be desirable to coordinate the visual display of information or lighting effects, with audible sounds produced via the speaker. Still further, it may be desirable to coordinate vibrations produced by vibratory components with one or both of the visual and the audible presentations.

One such method for managing the presentation of audio information has been through the use of files and or commands conforming to the musical instrument digital interface (MIDI) data format standard. Previously, the MIDI data format standard has been extended to accommodate vibrations produced by a vibratory component. MIDI has further previously supported show controls, which have been used to manage and control lighting effects. However, the use of show controls often involves cumbersome manual encoding of complex hexadecimal sequences. The hexadecimal control sequences then need to be embedded, often manually, into a MIDI sequence event listing at the desired location.

While user friendly visual editors exist for the creation and management of the audio portions of a MIDI data file, few, if any, editors provide for the convenient management of lighting information, with or without the usage of the existing show controls. Consequently, it would be beneficial to develop and/or incorporate a more user friendly manner, in which to manage lighting effects, including managing the coordination of the lighting effects with other forms of modalities.

The present inventors have recognized, that by mapping lighting effects to existing audio commands and including the mapped lighting effects in the form of existing audio commands in an audio file format, that the lighting effects can be created and managed in a manner which is similar to and/or consistent with the manner in which the audio controls are created and managed.

SUMMARY OF THE INVENTION

The present invention provides an audio file format, which includes definitions for one or more instruments. The audio file format additionally comprises one or more light groupings, where each light grouping includes one or more light sources and is associated with a corresponding one of the one or more instrument definitions.

In at least one embodiment, the audio file format additionally includes definitions for one or more notes, which are associated with corresponding instrument definitions. When a note is defined for an instrument definition that corresponds to a light grouping, the one or more note definitions correspond to one or more colors.

In at least a further embodiment, the audio file format conforms to the MIDI (musical instrument digital interface) specification, which includes MIDI system commands.

In a still further embodiment, the audio file format is at least one of received, stored, and played in an electronic device, like a cellular telephone, which has one or more light groupings.

The present invention further provides a method for controlling lighting effects using an audio file format. The method comprises assigning an instrument definition to each of one or more light groupings, which each have one or more light sources. Commands are then received for the instrument definitions assigned to at least one of the one or more light groupings. The illumination of the one or more light sources within the respective light grouping is then controlled in accordance with the commands received for the corresponding instrument definition.

In at least one embodiment, receiving commands for the instrument definitions includes receiving one or more note definitions associated with an instrument definition assigned to one of the one or more light groupings, and controlling the illumination of the one or more light sources includes controlling the color displayed by the one or more light sources within the light grouping in accordance with the value of the one or more note definitions.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
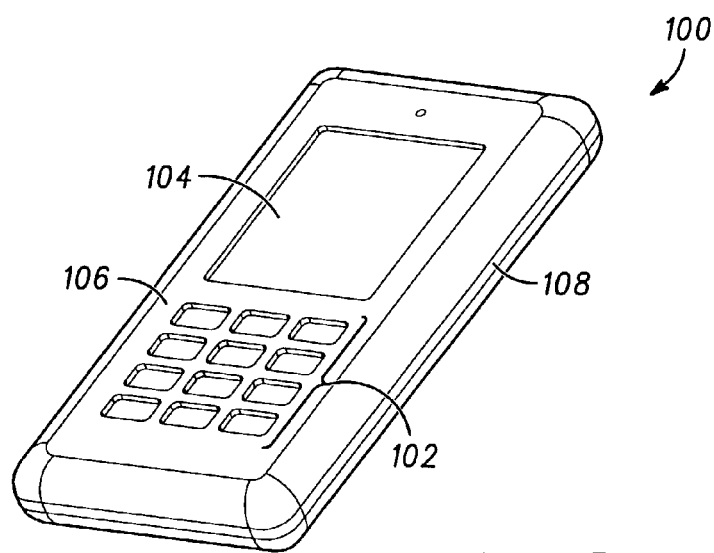
FIG. 1 is a perspective view of a hand held device, which includes a set of light groupings, in accordance with at least one embodiment of the present invention, within which an audio file format including lighting controls can be used.

While the present invention is susceptible of embodiment in various forms, there is shown in the drawings and will hereinafter be described several embodiments with the understanding that the present disclosure is to be considered an exemplification of the invention and is not intended to limit the invention to the specific embodiments illustrated.

FIG. 1 illustrates a perspective view of a hand held device 100, which includes a set of light groupings, in accordance with at least one embodiment of the present invention, within which an audio file format including lighting controls can be used. The hand held device 100 includes a keypad 102 having multiple keys, which can be selectively actuated, and a display 104 for visually presenting information to a user. The hand held device 100 additionally includes two electro-luminescent (EL) side panels 106 and 108, which can be separately illuminated.

At least one LED is associated with each of the keys of the keypad, and which together form a grouping of light sources. In addition to the light grouping associated with the keypad, the back lighting for the display forms a second grouping. The electro-luminescent side panels, each corresponds to a separate grouping. In this instance four separate groupings are defined.

Together the light groupings can be used to personalize or enhance the user's visual experience, while using the device. As noted previously, lighting effects can be used to provide visual ring tone alerts, visual indications of amplitude and frequency of ambient noise, and/or visual indications of battery or signal strength, as well as to perform or enhance other functions or features. By defining multiple lighting groups, each group can be separately controlled. The specific order and/or sequence that the light groupings illuminate can be defined in at least some instances by the user, and in other instances, they may be predefined or have default settings, which are determined by a visual composer. In other instances, they can be coordinated with audible sounds and/or vibrations produced by the device, in a manner, which generally attempts to enhance the user's experience.

While the above listed set of groupings includes four distinct groupings, each having its own separate group of light sources, in some instances a particular light source may be a member of multiple light groupings. Additionally, a number of groupings greater than four can be defined. For example, each of the light sources associated with each of the individual keys of the keypad could correspond to an additional separate grouping, while at the same time the light sources corresponding to each of the individual keys could be associated, together, with the keypad grouping.

Figure 2:
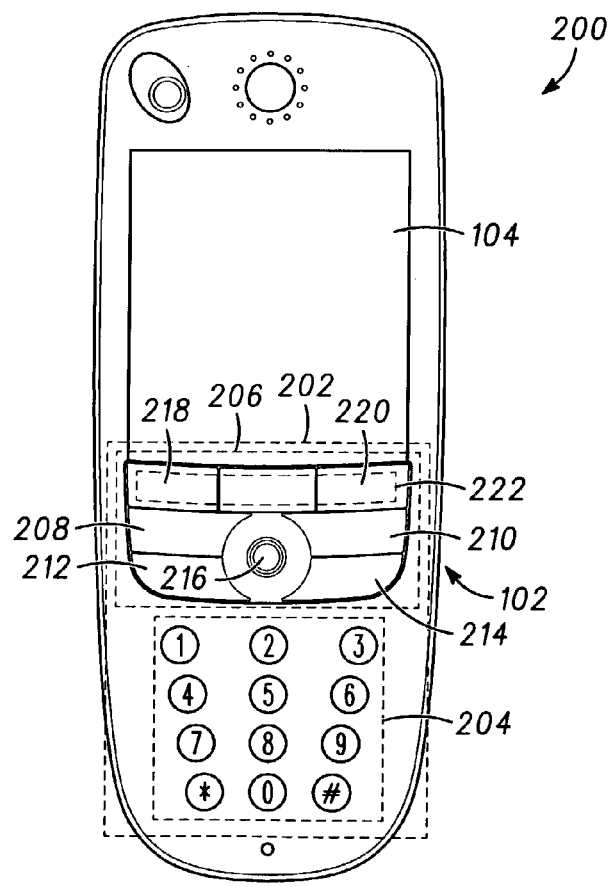
FIG. 2 is a plan view of a hand held device incorporating an alternative set of light groupings, in accordance with at least an alternative embodiment of the present invention.

FIG. 2 illustrates a plan view of a hand held device 200 incorporating an alternative set of light groupings, in accordance with at least an alternative embodiment of the present invention. In this embodiment, at least one set of light groupings includes a first grouping 202 comprised of the light sources associated with all of the keys. A second grouping 204 includes the light sources associated with the keys of the numeric keypad. Groupings 3 through 14 each correspond to a light source associated with an individual key of the numeric keypad including the asterick and the pound key.

A fifteenth grouping 206 incorporates the light sources associated with each of the navigation keys. The sixteenth through twentieth groups correspond to the light sources of respective ones of the individual navigation keys 208, 210, 212, 214 and 216. A twenty-first group includes the light sources associated with the send key 218 and the end key 220. The twenty-second and twenty-third groups separately correspond to the light sources associated with each of the respective send key 218 and the end key 220. Lastly, a twenty-fourth light grouping includes the light sources associated with all of the menu keys 222, including the key located between the send key 218 and the end key 220. However, one skilled in the art will readily recognize that additional and/or alternative light groupings are possible without departing from the teachings of the present invention, including groupings, that include light sources associated with elements separate from the keypad 102.

In at least one embodiment of the present invention, each of the light groupings is associated with an instrument definition in an audio format file, such as a MIDI (musical instrument digital interface) file format. One of the advantages of associating the light groupings with a standard musical file format is the enhanced ability to synchronize the lighting effects with the audio playback of the audio data encoded in the musical file format, such as a MIDI file. A further advantage enables a light composer to make use of a library of well developed tools and feature definitions, which are already available for the development, and editing of MIDI format files.

In MIDI format files, the instrument definitions are also commonly referred to and/or are associated with patch numbers. The MIDI standard presently allows for 128 patch numbers per bank, and up to 128 banks. In the illustrated embodiment, at least one bank, bank 7A, is associated with lighting groups. Bank 7A does not interfere with the standard instrument definitions, that are presently defined, and is currently generally not specifically used within the standard. Additional banks could additionally be defined for use with additional lighting groups, as necessary. A MIDI interpreter or play-back device, which does not support lighting groups, would generally ignore sound tracks defined for unknown instruments. Consequently, the MIDI files with embedded lighting controls would generally not interfere with devices incapable of displaying lighting effects, so long as the instrument definitions which are used for lighting are not otherwise used or defined. In essence, this would allow a degree of backwards compatibility.

In addition to associating the lighting group with the patch numbers that are commonly assigned to instrument definitions, other commands more commonly associated with audio functions, are correspondingly mapped to other lighting effects. For example, in at least one embodiment note numbers, of which there are presently 128, are assigned to different colors. Each of the notes may correspond to a subset of the different standard colors defined for HTML (hyper-text markup language). Such that, if a note is initiated on an instrument definition corresponding to a lighting group, a color associated with the note value will be illuminated on the light sources within the lighting group. Furthermore the possibility exists that user defined colors may be possible, and/or additional colors could be created by instructing the MIDI interpreter to play (display) multiple notes (colors) for the same instrument (lighting group), simultaneously or during a period which overlaps in time. This is similar to playing a chord. The MIDI interpreter could appropriately mix the two signals related to each of the separate notes (colors) to produce a single output signal, corresponding to a color which may not be otherwise defined.

Furthermore volume could be used to define and control light intensity. Note velocity could be used to define and control the rate of ramp-up and ramp-down of light intensity. A modulation could be defined to control the amplitude of a waveform (sine, square, triangle, etc.) that is superimposed on the volume level. In at least a couple of instances, the light intensity can be controlled by altering the duty cycle of a signal, or the amplitude of the signal, that is supplied to the light sources. Still further, a pitch bend could be used to define and control a substantially continuous shift in the hue displayed for the lighting group, between two relative note (color) values.

As a final example, duration of a note, as well as the corresponding start and end times of each note, will define and control the start time and the end time of the illumination of the lighting groups relative to a time reference.

While instruments definitions, in the MIDI file format, often have an ADSR (attack, decay, sustain and release), associated with it, in at least one of the embodiments of the present invention, this is largely not used. The light is generally on and off, as far as the instrument definition is concerned, and any corresponding effects are controlled by other audio type controls, several of which have been noted above.

One or more standard lighting layouts could similarly, be incorporated into the specification, in this way any given lighting pattern data file will generally produce the same or similar results on a range of devices upon which it is intended to be played. Because MIDI can support the playback of multiple instruments simultaneously, both the playback of sounds and lighting patterns can be simultaneously supported, as well as any vibration effects, which may similarly be encoded.

A further advantage of using a well known already existing audio format, like MIDI format files, to incorporate lighting control commands, is that many existing devices already accommodate the download, storage and/or playback/interpretation of the file type. For example, ring tones can be presently downloaded for many types of telephones from service providers and carriers.

Figure 3:
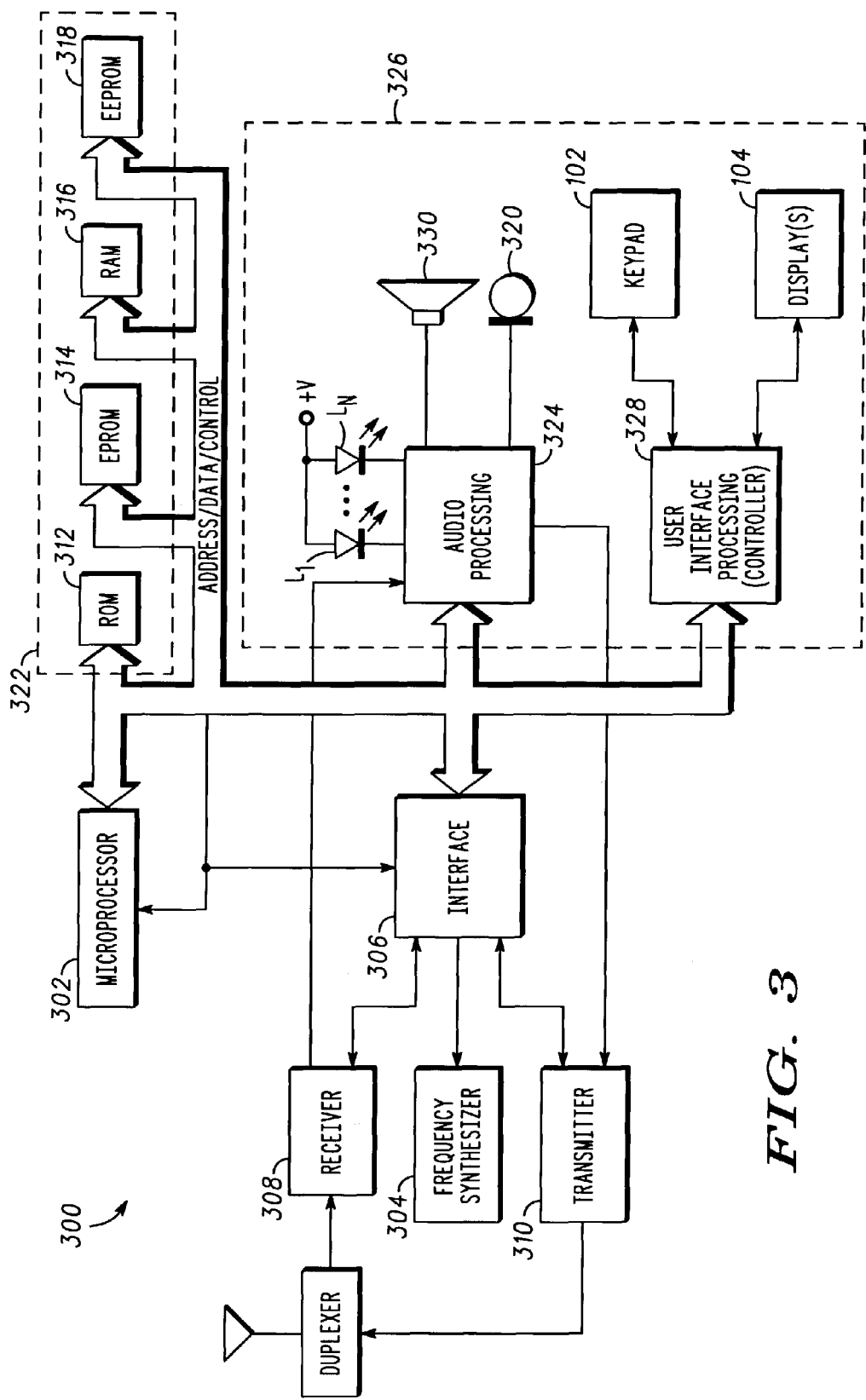
FIG. 3 is a block diagram of a wireless communication device, within which the audio file format of the present invention can be used to control lighting effects.

In at least one embodiment, the present invention is incorporated within an electronic device, like a wireless communication device. FIG. 3 illustrates a block diagram of a wireless communication device 300, like a cellular telephone, within which the present invention can be incorporated. Generally, the wireless communication device communicates information via radio frequency signals. In the wireless communication device 300, the particular radio frequency is determined by the microprocessor 302. The particular radio frequency is conveyed to the frequency synthesizer 304 via the interface circuitry 306. Data signals received by the receiver 308 are decoded and coupled to the microprocessor 302 by the interface circuitry 306, and data signals to be transmitted by the transmitter 310 are generated by the microprocessor 302 and formatted by the interface circuitry 306 before being transmitted by the transmitter 310. Operational status of the transmitter 310 and the receiver 308 is enabled or disabled by the interface circuitry 306.

In at least one embodiment, the microprocessor 302, an audio processor 324, and a user interface processor 328 perform many of the processing functions under the control of program instructions stored in a memory section 322. Together, the microprocessor 302, the audio processor 324, and the user interface processor 328 can include one or more microprocessors, one or more of which may include a digital signal processor (DSP). The memory section 322 includes one or more forms of volatile and/or non-volatile memory including conventional ROM 312, EPROM 314, RAM 316, or EEPROM 318. One skilled in the art will readily recognize that other types of memory are possible.

Identifying features of the wireless communication device are typically stored in EEPROM 318 (which may also be stored in the microprocessor in an on-board EEPROM, if available) and can include the number assignment (NAM) required for operation in a conventional cellular system and/or the base identification (BID) required for operation with a cordless base. Additionally stored in the memory section 322 are prestored instructions for handling the receipt, storage and processing of an audio format file, including audio format files that incorporate lighting control commands, as well as the audio control commands.

Control of user audio, the microphone 320 and the speakers, corresponding to a transducer 330, illustrated in FIGS. 3, is controlled by the audio processor or audio processing circuitry 324, which forms part of a user interface circuit 326. The user interface circuit 326 additionally includes the user interface processor or user interface processing circuitry 328, which manages the operation of any keypad(s) 102 and/or display(s) 104. It is further envisioned that any keypad operation could be included as part of a touch sensitive display. In the illustrated embodiment at least some of the lighting sources L1-LN, associated with the light groupings, are also controlled by the audio processing circuitry 324. However, in some embodiments the audio processing circuitry may transmit commands to other control elements, which more directly control the illumination of the lighting sources. Still further an alternative processor could be used to execute a set of operating instructions associated with an audio file (e.g. MIDI) interpreter.

While the present invention has generally been described in association with a wireless communication device, like a cell phone, radiotelephone, or a cordless telephone, one skilled in the art will readily recognize that the invention is suitable for use with other types of devices. At least a couple of additional examples of other types of devices, where the use of the present invention would be suitable include paging devices, personal digital assistants, portable computers, pen-based or keyboard-based handheld devices, remote control units, an audio player (such as an MP3 player) and the like.

Figure 4:
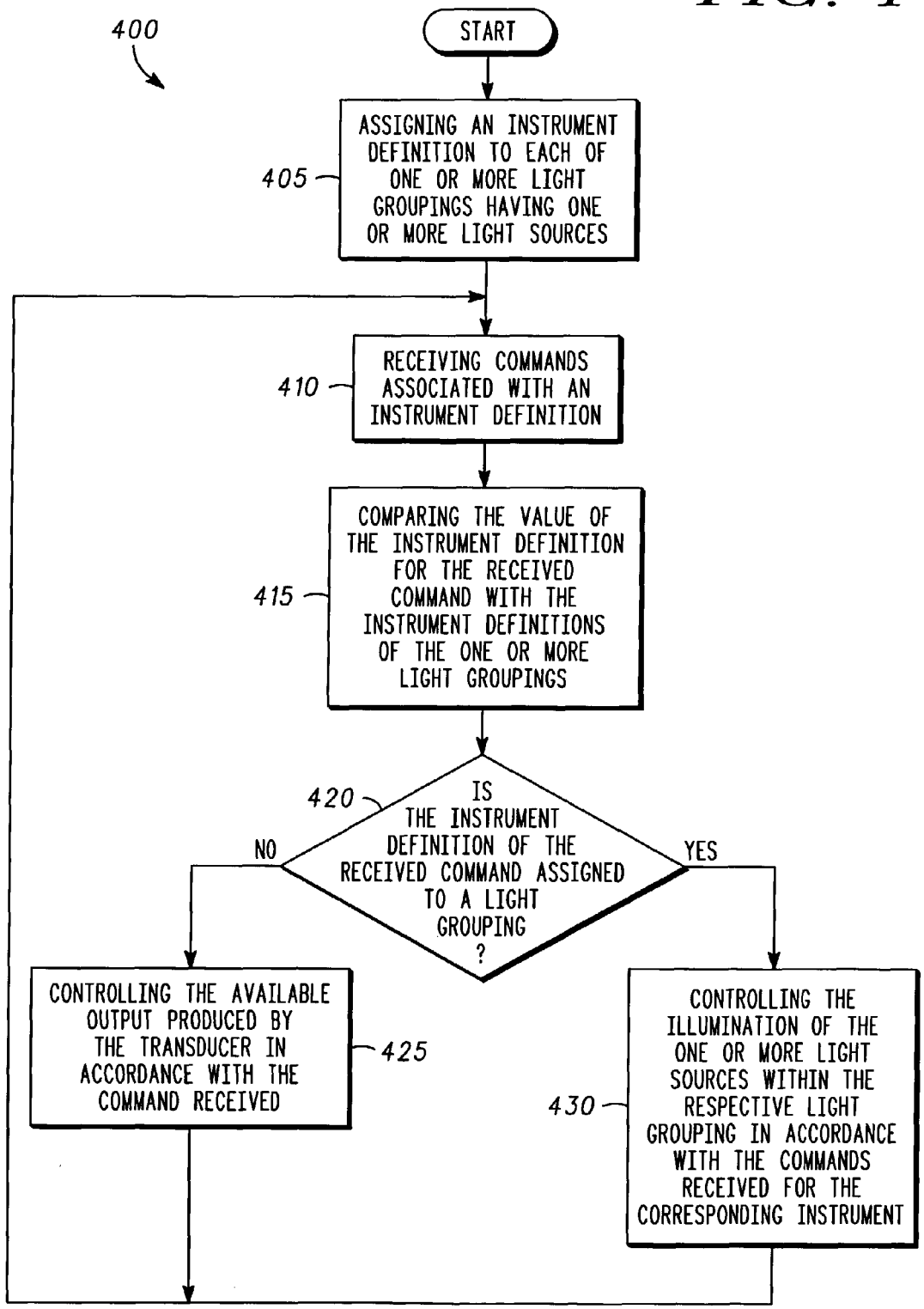
FIG. 4 is a flow diagram of a method for controlling lighting effects using an audio file format, in accordance with at least one embodiment of the present invention.

FIG. 4 illustrates a flow diagram of a method 400 for controlling lighting effects using an audio file format. The method includes assigning 405 an instrument definition to each of one or more light groupings having one or more light sources. Commands are then received 410 and/or executed from an audio file, which is in conformance with the audio file format, and is associated with an instrument definition (patch number).

The value of the instrument definition for which the command was received is compared 415 with the instrument definitions of the one or more light groupings. A determination is then made 420, as to whether the received command is assigned to a light grouping or an instrument for audio playback. If the instrument definition, corresponds to an instrument for audio playback, the command is used to control 425 the audible output produced by a transducer. If the instrument definition, corresponds to an instrument associated with a light groupings, then the illumination of the light grouping is controlled 430, in accordance with the commands received for the corresponding instrument.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for controlling lighting effects using an audio file comprising:
   assigning an instrument definition associated with the audio file to each of one or more light groupings having one or more light sources, where each instrument definition assigned to a light grouping is exclusively assigned to a corresponding one of the one or more light groupings;

receiving commands for one of the instrument definitions exclusively assigned to one of the one or more light groupings; and controlling the illumination of the one or more light sources within the respective light grouping in accordance with the commands received for the corresponding instrument definition, wherein receiving commands for the instrument definitions includes receiving one or more note definitions associated with an instrument definition assigned to one of the one or more light groupings, and wherein controlling the illumination of the one or more light sources includes controlling the color displayed by the one or more light sources within the light grouping in accordance with the value of the one or more note definitions;

and wherein receiving commands for the instrument definitions additionally includes commands for receiving at least one of volume definitions, note velocity definitions and modulation definitions, associated with at least some of the one or more note definitions, and wherein controlling the illumination of the one or more light sources additionally includes controlling the light intensity of the color displayed by the one or more light sources within the light grouping in accordance with the at least one of volume definitions, note velocity definitions and modulation definitions.

2. A method for controlling lighting effects using an audio file comprising:

assigning an instrument definition associated with the audio file to each of one or more light groupings having one or more light sources, where each instrument definition assigned to a light grouping is exclusively assigned to a corresponding one of the one or more light groupings;

receiving commands for one of the instrument definitions exclusively assigned to one of the one or more light groupings; and controlling the illumination of the one or more light sources within the respective light grouping in accordance with the commands received for the corresponding instrument definition, wherein receiving commands for the instrument definitions includes receiving one or more note definitions associated with an instrument definition assigned to one of the one or more light groupings, and wherein controlling the illumination of the one or more light sources includes controlling the color displayed by the one or more light sources within the light grouping in accordance with the value of the one or more note definitions;

and wherein the note definitions include relative start times and relative end times, which when associated with instrument definitions assigned to each of the one or more lighting groups affects the start time and the end time of the illumination of the light sources within the corresponding lighting groups.

* * * * *